Dec. 29, 1925.
1,567,640
G. A. GUYOT
EXPANSIBLE CHAIN
Filed March 23, 1925
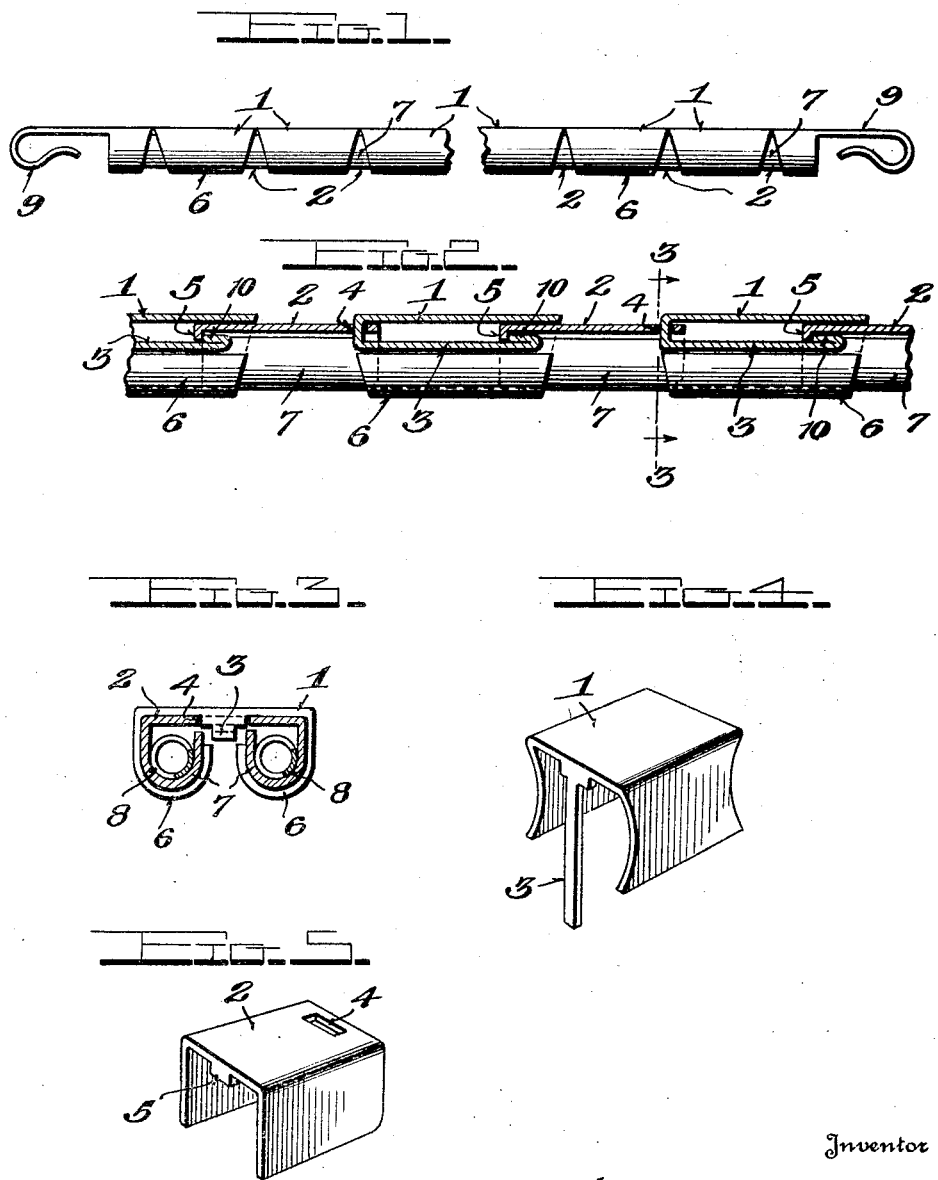
Inventor
Gaston A. Guyot
By Joseph A. Miller
Attorney Patented Dec. 29, 1925.

1,567,640

UNITED STATES PATENT OFFICE.

GASTON A. GUYOT, OF ATTLEBORO, MASSACHUSETTS, ASSIGNOR TO GUYOT BROTHERS, OF ATTLEBORO, MASSACHUSETTS.

EXPANSIBLE CHAIN.

Application filed March 23, 1925. Serial No. 17,663.

*To all whom it may concern:*

Be it known that I, GASTON A. GUYOT, a citizen of the United States, residing at Attleboro, in the county of Bristol and State of Massachusetts, have invented new and useful Improvements in Expansible Chains, of which the following is a specification.

This invention relates to certain new and useful improvements in expansible chains, more particularly for use in connection with wrist watch bracelets.

The primary object of the invention is to provide an improved simplified and economical chain structure of this type which enables the parts to be easily and quickly assembled.

A further object of the invention is to provide a collapsible chain with improved connecting means which acts to also restrict expansible movement of the links or boxes in a novel and simple manner.

In the drawings:—

Figure 1 is a side elevation;

Figure 2 is a fragmentary longitudinal section;

Figure 3 is a section on line 3—3 of Fig. 2,

Figure 4 is a detail perspective view of one of the main members in a partial state of completion, and Figure 5 is a similar view of one of the connector members.

In proceeding in accordance with the present invention, main members 1 are provided, and are connected by connector members 2. The main members 1 are provided at one end with integral narrow stems 3 which latter are passed through slots 4 provided therefor in the adjacent end of the adjacent member 2 thereby to hingedly connect such member. The opposite end of each member 2 is provided with an inwardly projecting stop lug 5.

As depicted in the drawings, the members 1 and 2 telescope or are relatively collapsible and have their sides rolled inwardly to form hollow ribs or guides 6 and 7 respectively to guide the telescopic and extensible movements of the respective members. Coil springs 8 extend through the interiors of the ribs and are connected at their ends to the endmost members of the chain, to which latter members hooks 9 are soldered or otherwise fastened.

The stem 2 it will be noted have their free ends 10 bent inwardly upon themselves to form abutments, which latter engage the stops 5 of the connector members thereby to restrict extensible movement of the main members.

From the foregoing it will be seen that the stems 3 not only hingedly connect the two series of members, but also function to restrict extensible movement of the members.

Having thus described my invention, what I claim as new and desire to secure by Letters Patent is:—

1. In an expansible chain, main members having integral inwardly extending stems at one end thereof, the extremities of which are doubled upon themselves to form abutments, connector members having slots at one end through which the stems extend to hingedly connect same to the main members, stops on the opposite ends of the connector members engageable with the abutments to limit outward movement of the adjacent main members, the sides of each of the members being extended inwardly to form hollow ribs, the ribs of adjacent members being telescoped, and springs extending through the respective alined ribs to tension all the members.

2. In an expansible chain, main members having integral inwardly extending stems at one end thereof, the extremities of which are doubled upon themselves to form abutments, connector members having slots at one end through which the stems extend to hingedly connect same to the main members and stops on the opposite ends of the connector members engageable with the abutments to limit outward movement of the adjacent main members.

3. In an expansible chain, main members, connector members telescopically related thereto and having stops, and unitary means carried by the main members for hingedly connecting same to the adjacent ends of the respective adjacent connector members and for engaging the stops of the respective next adjacent connector members to limit outward movement thereof.

4. In an expansible chain, main members, connector members telescopically related thereto and having stops, and a member integral with an end of each main member and extending through an opening provided therefor in the adjacent end of the adjacent connector member to hingedly connect the latter to the main member, said integral member having an abutment, for engagement with the stop of the adjacent connector member to limit outward movement of the main member.

5. In an expansible chain, main and connector members each having a pair of telescopically related hollow side ribs, means to hingedly connect adjacent ends of the main and connector members, stops on the connector members engageable with the hinging means to restrict outward movement of the adjacent main members, and tensioning means for all of the members disposed in the hollow ribs.

6. In an expansible chain, main and connector members each having a pair of telescopically related hollow side ribs, means to hingedly connect adjacent ends of the main and connector members and stops on the connector members engageable with the hinging means to restrict outward movement of the adjacent main members.

7. In a chain, main members having stems integrally connected thereto at one end and extending to adjacent the opposite ends of the main members, slidable connector members movably connected at one end to the first named ends of the stems and having their opposite ends disposed adjacent to the said opposite end of the stem of the next adjacent main member, and cooperating stops on the last named ends of the stems and the connector members.

8. In a chain, main members, connector members slidably engaged at one end with the main members, means integral with the main members to hingedly connect the opposite ends of adjacent connector members thereto and provided with stops, and stops on the first named ends of the connector members for engagement with said first named stops.

In testimony whereof I have signed my name to this specification.

GASTON A. GUYOT.